(12) United States Patent
Lockwood

(10) Patent No.: US 7,010,508 B1
(45) Date of Patent: Mar. 7, 2006

(54) AUTOMATED MULTIMEDIA DATA PROCESSING NETWORK

(76) Inventor: Lawrence B. Lockwood, 5935 Folsom Dr., La Jolla, CA (US) 92037

(*) Notice: Subject to any disclaimer, the term of this patent is extended or adjusted under 35 U.S.C. 154(b) by 0 days.

(21) Appl. No.: 08/418,772

(22) Filed: Apr. 7, 1995

Related U.S. Application Data

(63) Continuation of application No. 08/347,270, filed on Nov. 30, 1994, now Pat. No. 6,289,319, which is a continuation of application No. 08/096,610, filed on Jul. 23, 1993, now abandoned, which is a continuation of application No. 07/752,026, filed on Aug. 29, 1991, now abandoned, which is a continuation of application No. 07/168,856, filed on Mar. 16, 1988, now abandoned, which is a continuation of application No. 06/822,115, filed on Jan. 24, 1986, now abandoned, which is a continuation-in-part of application No. 06/613,525, filed on May 24, 1984, now Pat. No. 4,567,359.

(51) Int. Cl.
*G06F 17/60* (2006.01)

(52) U.S. Cl. ........................................ 705/35
(58) Field of Classification Search ................ 235/381, 235/380, 379; 705/35
See application file for complete search history.

(56) References Cited

U.S. PATENT DOCUMENTS 4,333,152 A * 6/1982 Best ............................ 395/152
4,359,631 A * 11/1982 Lockwood et al. ......... 235/381
4,714,989 A 12/1987 Billings ....................... 364/200

OTHER PUBLICATIONS

Young, G, "Computer Firm to Help Buyers Shop for Loan", Washington Post, Virginia, Real Estate Section, Apr. 9, 1984 Nexis™ Excerpts.*

* cited by examiner

*Primary Examiner*—P. Austin Bradley
*Assistant Examiner*—X. Chung-Trans
(74) *Attorney, Agent, or Firm*—Charmasson, Buchaca & Leach, LLP

(57) ABSTRACT

A system for filing applications with an institution from a plurality of remote sites, and for automatically processing said applications in response to each applicant's credit rating obtained from a credit reporting service comprising a series of self-service terminals remotely linked via a telephone line to a first computer at the institution and to a second computer at the credit reporting service headquarters. Each remote terminal comprises a video screen and a video memory which holds image-and-sound-generating information arranged to simulate the aspect and speech of an application loan officer on the video screen. The simulated loan officer is used to acquire loan request data from the applicant by guiding him through an interactive sequence of inquiries and answers. The system may be utilized as a trading network whereby stations are used by sellers and buyers to place and accept offers for securities, the central installation acting as a central computerized database where all transactions are processed and the various data items stored and automatically updated.

17 Claims, 5 Drawing Sheets

AUTOMATED MULTIMEDIA DATA PROCESSING NETWORK

PRIOR APPLICATIONS

This is a continuation application of copending application Ser. No. 08/347,270 filed Nov. 30, 1994, U.S. Pat. No. 6,289,319 which is a continuation of Ser. No. 08/096,610 filed Jul. 23, 1993 abandoned, which is a continuations application Ser. No. 07/752,026 filed Aug. 29, 1991, abandoned, which is a continuation of application Ser. No. 07/168,856, filed Mar. 16, 1988, abandoned which is a continuation of application Ser. No. 06/822,115, filed Jan. 24, 1986, abandoned which is a continuation-in-part of application Ser. No. 06/613,525, filed May 24, 1984 now U.S. Pat. No. 4,567,359 issued Jan. 28, 1986.

BACKGROUND OF THE INVENTION

The present invention relates to automatic self-operated terminals, vending machines, and interactive data processing networks. More specifically, this invention relates to terminals used by banking and other financial institutions to make their services available at all hours of the day from various remote locations.

Loan processing has traditionally been a labor-intensive business which represents the major activity of banks and other financial institutions. In the processing of a loan application, numerous forms have to be filled-out, loan officers have to explain payment schedules and generally guide the applicant through the loan application process. The financial institution then has to process the application and either telephone, mail, or communicate acceptance or rejection of the loan in person to the applicant. The complexity of the process has so far prevented the application of automatic terminals to this important part of financial institution activities. Automatic vending machines and self-service terminals have evolved to a high degree of sophistication as disclosed in U.S. Pat. No. 4,359,631 Lockwood, et al. Yet, this high degree of sophistication has not been put to use in the more complex types of goods and services distribution which requires a great deal of interaction between individuals or between individuals and institutions.

SUMMARY OF THE INVENTION

The principal object of this invention is to provide an economical means for screening loan applications. When one considers that up to 75% of persons applying for loans fail to meet the financial institution qualification criteria, one realizes that a great deal of labor is required by loan officers before a qualified applicant presents himself.

Another object of the invention is to standardize the reporting and interpretation of credit ratings and their application to loan application processing.

A further object of the invention is to reduce the amount of paperwork and processing time required by each loan application.

It is also an object of the invention to offer a more personal way to apply for credit. Many applicants who would not hesitate to use a mechanical device to place their inquiry are reluctant to inquire about loans requiring face-to-face interaction with a loan officer.

These and other objects are achieved by means of a system that ties together financial institution data processing, the computer services of a credit reporting bureau, and a plurality of remote terminals. Each remote terminal displays the live image of a fictitious loan officer who helps the applicant through an interactive series of questions and answers designed to solicit from the applicant all the information necessary to process his loan application. The terminal can acquire credit rating information about the applicant from the credit reporting bureau and make a decision based on all the information gathered about the credit worthiness of the applicant and the amount of loan to which he is entitled. The loan amount is then communicated to the applicant and to the financial institution for further processing of the loan.

DESCRIPTION OF THE PREFERRED EMBODIMENT OF THE INVENTION

Figure 1:
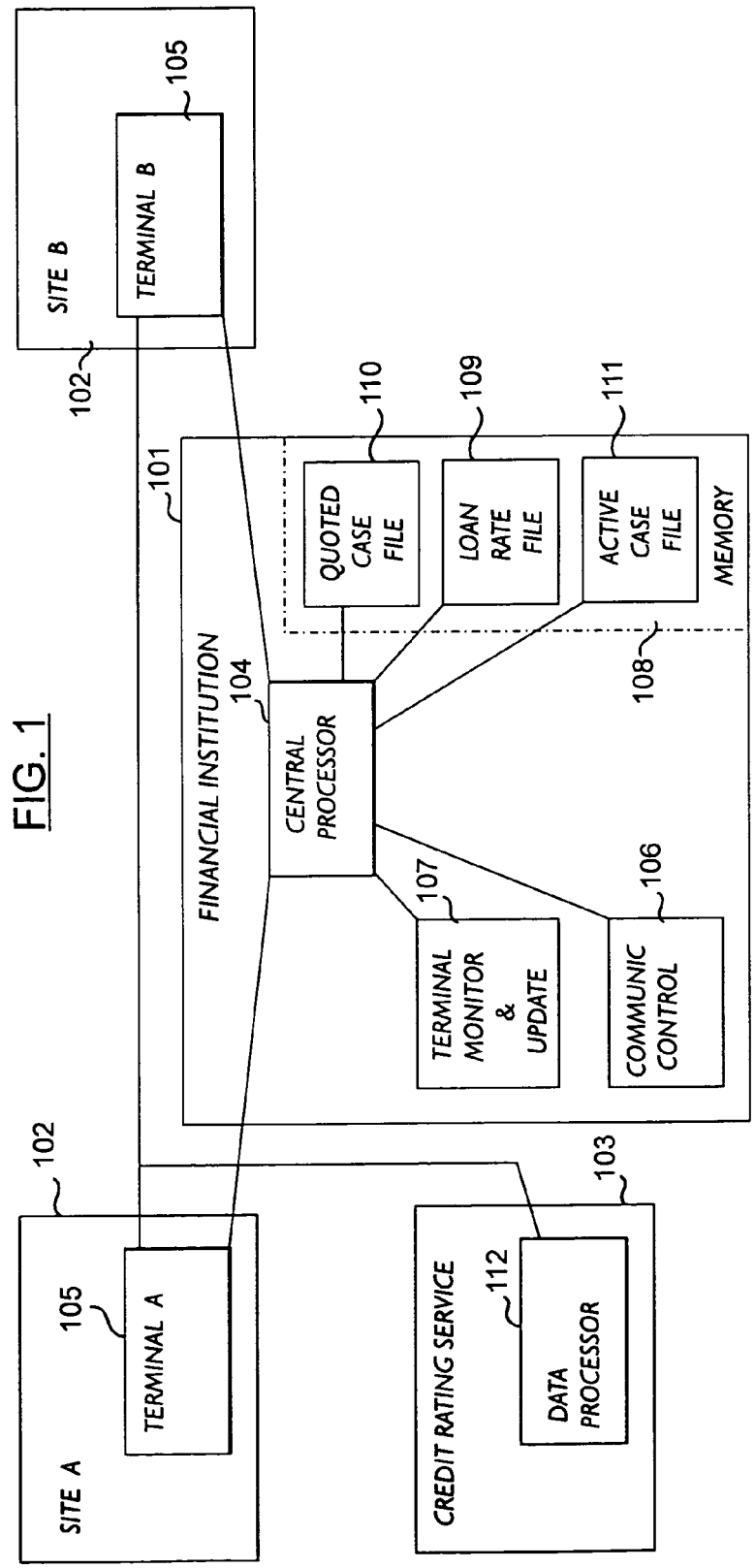
FIG. 1 is a general block diagram of the system for automatically processing loan applications.

Referring now to the drawings, there is shown in FIG. 1 the general block diagram of the automatic loan processing terminal system. The system links a financial institution 101, a plurality of self-service terminals at various remote sites 102 and a credit rating service 103 by telephone lines or other means of telecommunication. The financial institution 101 is provided with a central processor 104 which is used primarily to process loan applications and handle other financial transactions. The central processor 104 has a communication interface which allows it to access the various terminals 105 at the remote sites and be accessed by them at any time of the day. A communication control unit 106 associated with the central processor 104 assures an orderly sending and receiving of information between the terminals and the central processor. The communication control unit 106 provides for a quick transfer of batches of information to and from the terminals 105 under direct access memory mode. Direct access memory modes are achieved by means of high speed data exchange units such as those manufactured by Metacomp, Inc. of San Diego, Calif. and sold under the mark METAPAKS. The central processor 104 is also provided with a terminal monitor and update unit 107 which is programmed for periodically polling the various terminals 105 in order to verify their status and proper operation and to update the data stored in those terminals as may be required. The memory 108 of the central processor 104 holds some files 109 in which are stored information about the various loans available to customers from the institution. This information includes loan rates and repayment schedules. These loans include real estate loans, loans to finance the purchase of automobiles, boats and other vehicles, personal loans secured by certificates of deposit, stocks and other assets controlled by the financial institution 101 and unsecured personal loans. Loan packages which have been quoted to customers are stored in a quoted case file 110 pending acceptance and execution by the applicant. Once a loan has been approved and accepted it is processed and monitored through, an active case file 111. The credit rating service 103 is an institution such as TRW CREDENTIAL SERVICE which maintains financial files of consumers based on past and current loan payment obligations, credit card uses and balance sheets provided as part of loan applications, and makes that information available to a membership of merchants and financial institutions who need to access the credit worthiness of a particular customer. The credit rating service information is processed automatically by a data processor 112 equipped with automatic communication interface. This interface allows direct access through telephone lines or other communication networks by any subscribing member. The confidentiality of the credit rating service files is guaranteed by use of identifying codes which must be provided with each request.

The system operates as follows. The central processor 104 of the financial institution 101 periodically sends to the terminals 105 at the various remote sites 102 loan rate information and other data pertinent to the loans available from that institution which are extracted from the loan rate file 109. That information is stored in the various terminals and can be reviewed by an applicant in need of a loan. Once the applicant has selected a type of loan which is available from the institution, he is asked to provide the pertinent personal information data which will be necessary to process his loan application. The information provided by the applicant is supplemented by a financial profile obtained directly from the credit rating service after being automatically requested by the terminal 105. The terminal 105 is programmed to compute the credit worthiness of the applicant and to approve or disapprove the loan. Once the loan has been approved the applicant is requested to accept it or reject it. Accepted loan information is transmitted to the central processor of the financial institution and stored in the active case file 111. Information about loans which have not been accepted on the spot, are also transmitted to the financial institution and stored for a period of time in the quoted case file 110. The customer can return to one of the terminals and accept that loan anytime during the validity period.

Figure 2:
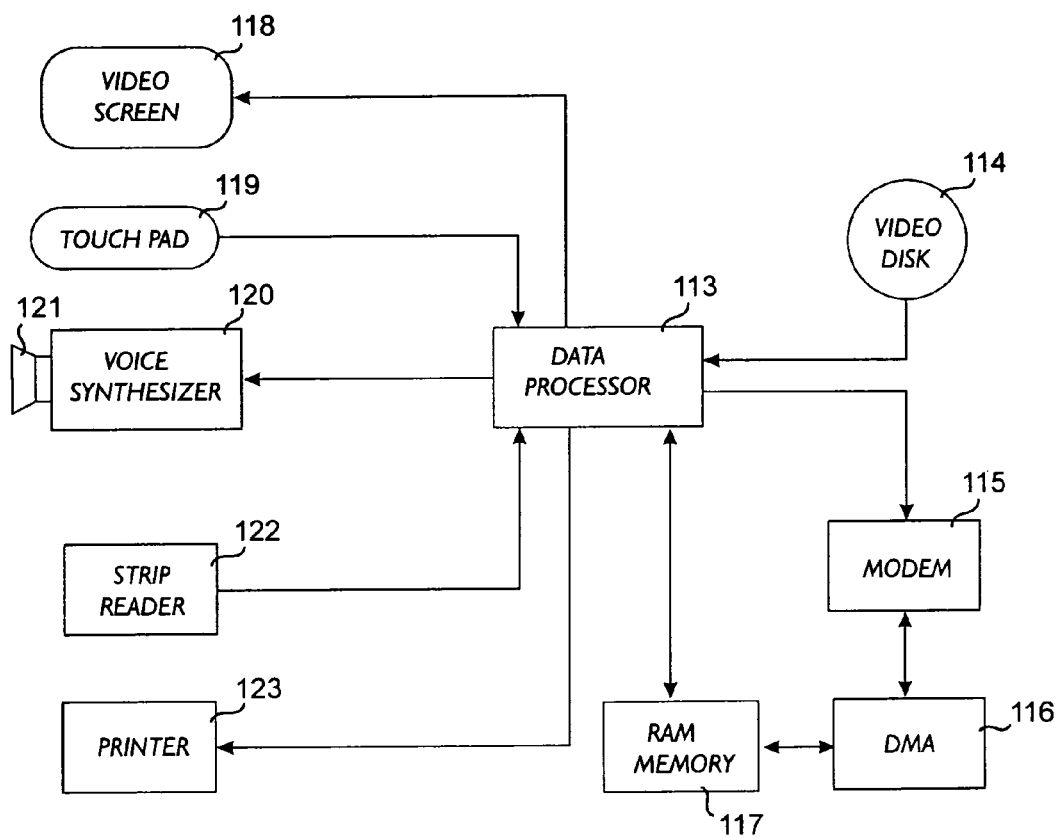
FIG. 2 is a block diagram showing the major components of the terminal.

Turning now to FIG. 2, there is shown a block diagram of the various components of a terminal 105. The operation of the terminal is controlled by a data processor 113. To the left of the processor, various blocks represent the peripheral equipment which interfaces with the applicant. To the right of the processor there is shown a videodisc 114 on which are stored all the permanent data necessary for the operation of the terminal including the data necessary to effectuate the interactive and automatic request of information by the terminal from the applicant. A modem 115 provides a two-way communication channel with the financial institution 101 and the credit rating service 103. The modem is controlled by the data processor 113 and handles a batch of information through a direct memory access unit 116, to and from a RAM memory 117. Thus, the RAM memory can be used to hold data obtained from the loan rate files 109 at the financial institution as well as applicant's financial profiles obtained from the credit rating service 103. The RAM memory can also be used to store some of the operating routines necessary for the operation of the terminal.

Communication with the applicant is done mainly through the video screen 118. The video screen 118 displays the picture of a fictitious loan officer who informs the applicant about the various types of loans available as well as the manner in which the application can be filed. The applicant answers the request of a loan officer by means of a touch pad 119 or a keyboard. Any entry made by the applicant on the touch pad 119 is processed and orally repeated immediately by means of a voice synthesizer 120 and loud speaker 121. The oral expression of the answers provided by the applicant is a way to assure that no false entry is made. A magnetic strip reader 122 may be provided so that the applicant can give an account number or an identification by means of a credit card. A printer 123 is used to deliver to the applicant a hard copy of any loan quotation as well as a confirmation of his accepted loan.

Figure 3:
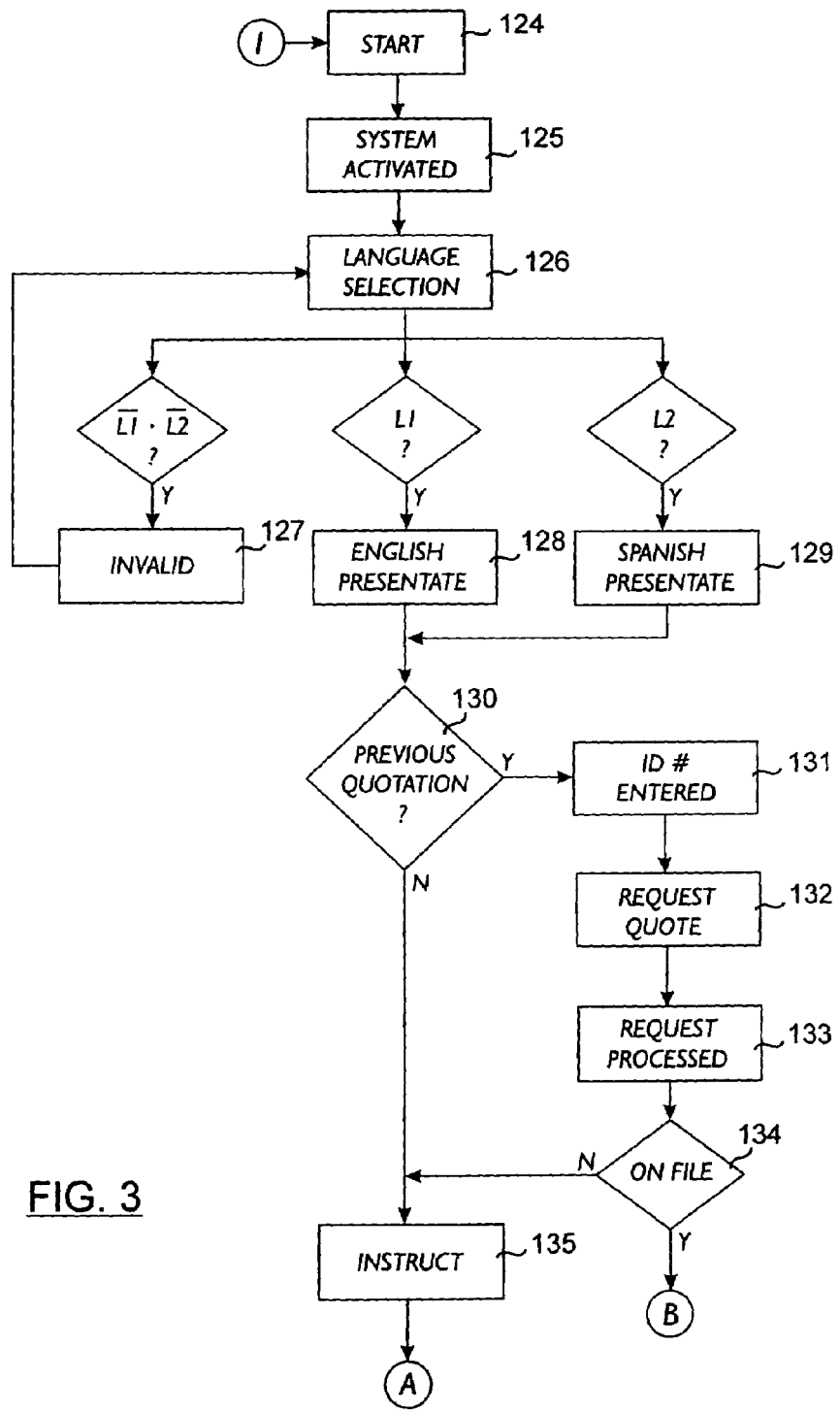
FIGS. 3 to 5 are detailed flow diagrams of the system operation.

FIG. 3 is a flow diagram of the system operation during the initial phase of the loan application process. The start 124 of system operation is triggered either by the applicant pushing a start button or by the automatic detection of his presence in front of the terminal. Once the system is activated 125 the recording of an image and sound of a fictitious loan officer is read from the videodisc 114 and appears on the video screen 118. The fictitious loan officer takes the applicant through a language selection routine 126–129. In this case, the applicant is asked in both English and Spanish in what language the loan transaction is to be conducted. In this phase of the operation as well as all interactive communications between the loan officer and the applicant, the loan officer explains to the applicant how to enter his answer by means of the touch pad 119. The applicant is then asked whether a previous quotation has already been prepared for him 130. In the affirmative, he is then requested 131 to enter a pass number or identification number either by entering the number on the touch pad or by running his credit I.D. card through the strip reader 122. The terminal then addresses the financial institution and requests 132 the prior loan quotation stored in the quoted case file 110 of the central processor 104. This is done by the data processor 113 of the terminal dialing the institution telephone number through the modem 115 and sending a request message. The terminal goes into a standby mode with its DMA unit 116 waiting for a transfer of information from the line into the RAM memory 117. The continued operation depends on whether or not the previous quotation is found 134 to be on file. If the answer is negative, the fictitious loan officer instructs 135 the applicant how to proceed to apply for a loan. In the case where a previous quotation is found to be on file, that quotation is transferred to the terminal according to the program routine B illustrated in FIG. 5.

Figure 4:
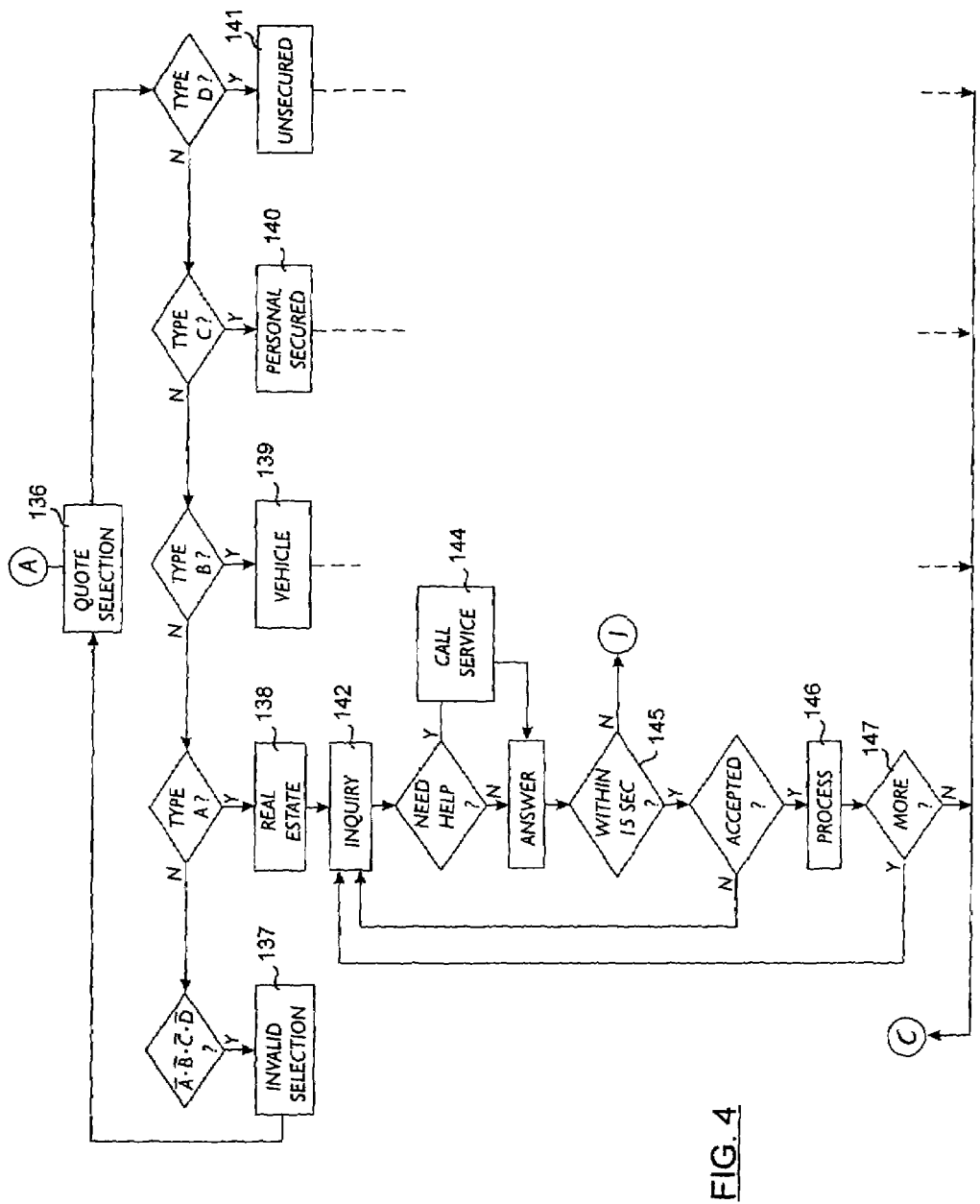

FIG. 4 is the flow diagram of the system operation during the acquisition of information by the terminal from the applicant. The applicant is first asked to select 136 the type of loan in which he is interested. In this case, he is offered a menu allowing him to choose between a real estate loan 138, a vehicle loan 139, a personal loan 140 secured by an asset held by the financial institution or a personal unsecured loan 141. Any invalid selection 137 triggers a new request. Once a type of loan has been selected, a real estate loan for example, the fictitious loan officer asks a series of inquiries corresponding to the questions that would be found on a standard loan application form. For each question, the system performs a subroutine 142–145 designed to guarantee proper input of the information into the terminal memory 117. If a problem develops during the question and answer period, the applicant is invited to call 144 the loan service at the financial institution. If the answer to a question is not received within fifteen seconds 145, the process of application is presumed to have been abandoned by the applicant and the system returns to its initial standby state. Once all the proper answers have been accepted, they are processed 146 by the terminal data processor 113. This process may involve analyzing certain key answers in order to identify any element or data that would automatically disqualify the applicant. Depending upon the result of that first analysis, more questions 147 may be presented to the applicant in order to refine the data necessary for a thorough assessment of his qualifications.

Figure 5:
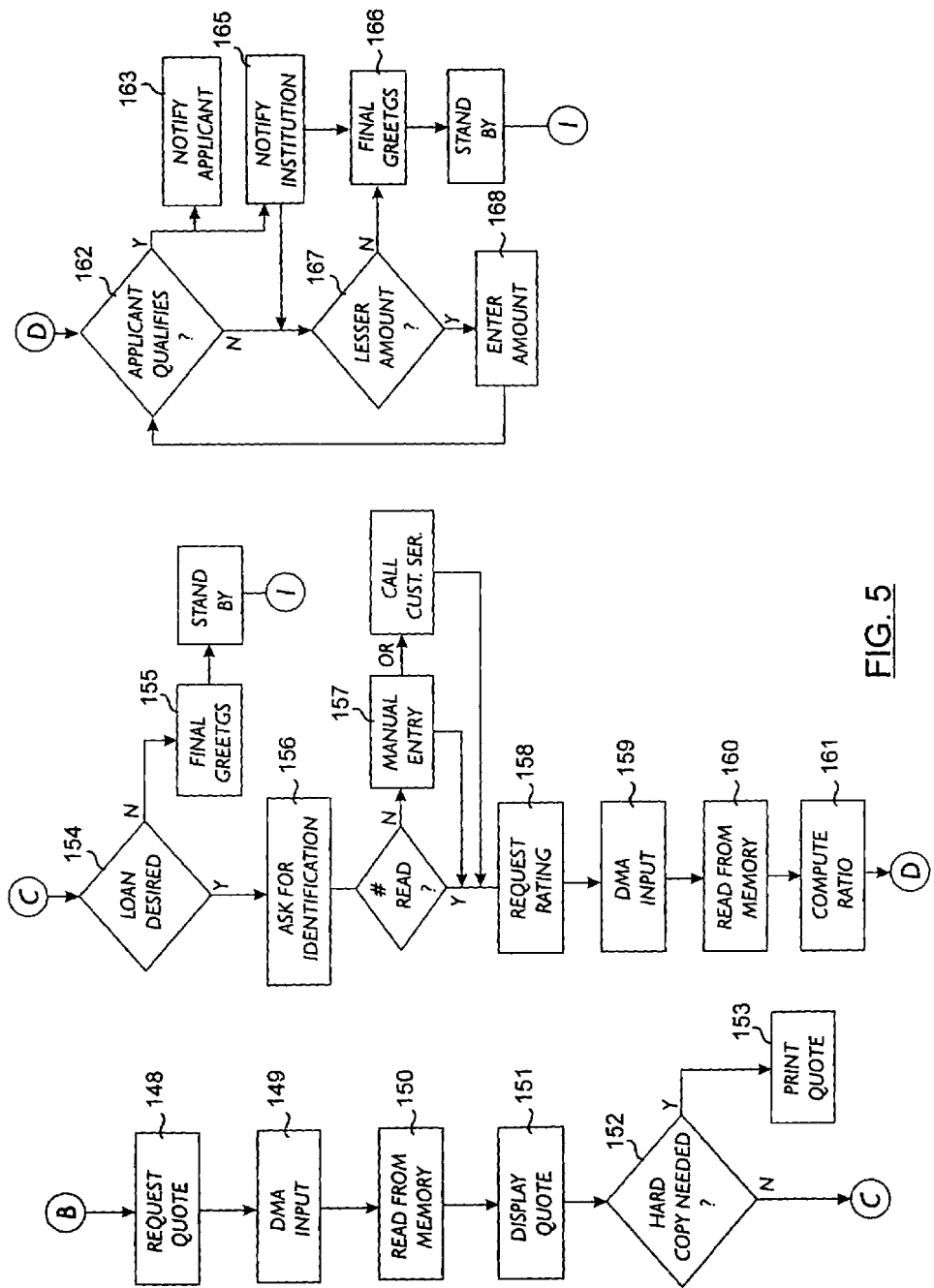

Turning now to FIG. 5, the B subroutine used to receive a previous quotation from the financial institution is illustrated in the first flow diagram. Once the previous quotation is requested 148 the DMA unit 116 of the terminal is allowed to receive a batch of information containing the previous quotation. This batch of information is stored in the RAM memory 117 from where it is retrieved 150 and displayed 151 on the video screen 118. The applicant is then asked if he wants a hard copy 152 of the quotation. In the affirmative, the previous quotation is printed 153 on printer 123. The second flow diagram corresponds to the acquisition of the applicant's financial profile from the credit rating service 103. Once a loan quotation has been presented to the applicant he is asked whether or not he wants to apply for the loan 154. If his answer is negative, the fictitious loan officer expresses final greetings 155. The loan quotation, if not already in storage at the financial institution, is transmitted there for temporary storage in the quoted case file 110 of the central processor 104. If the applicant wishes to apply for the loan, he is asked to provide a password or identification 156 which will allow the terminal to access his file at the credit rating service 103. As previously explained, this number can be entered directly by means of an identification card run through the strip reader 122 or entered manually 157 by means of the touch pad 119. The terminal requests a rating 158 from the credit rating service 103 in a manner similar to the one used and described previously for obtaining a previous quotation from the financial institution. The applicant's financial profile is received as a batch of information through the DMA unit 159 and then read from the memory 160. The financial profile is then analyzed by the terminal in order to compute 161 a debt ratio or other criterion devised by the financial institution to access the credit worthiness of the applicant. The debt ratio is the ratio of the applicant's current expenses to his current income. Other parameters such as debt to equity ratio or fixed assets to debt may be computed by the terminal data processor 113 and used in determining the qualifications of the applicant. It should be noted that the entire decision whether or not to grant the loan is performed automatically and onsite by the terminal 105 without intervention whatsoever from any of the financial institution personnel, except in case of a breakdown in communications by requesting a direct telephone call by the applicant to the financial institution.

The last flow diagram on the drawing represents the final phase of the loan application transaction. Once the terminal equipment has determined that the applicant qualifies 162 for the loan, the applicant is so notified 163, and instructed how to obtain the loan funds. The institution is also notified 165, and the loan is processed through the active case file 111 by the central processor 104. The fictitious loan officer closes the transaction by giving his final greetings 166 before the system is returned to a standby condition. If the applicant does not qualify for the amount of loan requested, he is first asked whether a lesser amount 167 would be acceptable to him. He is then instructed to enter the lesser amount 168 through the touch pad 119. That new amount is then checked against the determination already made by the terminal. The process is repeated until an acceptable amount is requested by the applicant, or until such time as the applicant declines to proceed with the loan application.

It should be noted that the system as described could be applied to other forms of transactions in which information has to be acquired from a customer then processed to a decision or into the performance of a particular task. A similar system could be used, for instance, for the preparation and filing of income tax returns. In such case, the assistance that the fictitious person who appears on the video screen can give to the applicant in filling-out the tax form can be easily programmed on the videodisc.

Related applications of the system include the selection and purchase of stocks and securities, the selection and opening of so-called "self-directed investments" such as Individual Retirement Accounts, and other complex transactions which normally require a great deal of time and attention on the part of the officers of an institution.

For instance, the above-described system may be utilized as a trading network between buyers and sellers of securities without changing the hardware components of the system, and with only minor adaptations of the programming routines. Each self-service terminal or station 105 can be used by either a seller or buyer of securities as well as a stock broker or other trading agency. The seller supplies information about the securities in his portfolio that he wants to trade by entering an offer to sell on his station 105. The offer is automatically transferred to the central processor 104 at an institution 101 acting as a clearinghouse. The information about the offer becomes part of a database stored in the memory 108 of the institution, such as in the active case file 111. Any prospective buyer can access the database through one of the stations 105 to evaluate what type of security may be available for purchase. The prospective buyer can then transmit an acceptance of one of the offers stored in the active case file 111 or transmit a counter-offer to purchase the same security at a lower price. The central processor 104 at the institution is used to match buy and sell offers, update the active case files and confirm transactions.

While the preferred embodiment of the invention has been described and several modifications have been suggested, other embodiments may be devised without departing from the spirit of the invention and the scope of the appended claims.

What is claimed is:

1. An automated multimedia system for data processing which comprises:
   a computerized installation including a database, means for entering data into said database, and a program means for storing, processing, updating, and retrieving data items in response to coded requests from stations in communication with said installation;
   at least one station including a general purpose computer and a program applicable to said computer for sending said requests to said installation;
   means for communicating data back and forth between said installation and said station;
   said station further including:
      a mass memory and means associated therewith for storing and retrieving textual and graphical data;
      a video display and means associated therewith for displaying textual and graphical data;
      means for entering information into said computer;
      means for programming sequences of inquiring messages on said video display in accordance with preset routines and in response to said information;
      said sequences including instructions to an operator of said station for operating said station; and
      means for selectively and interactively presenting to said operator interrelated textual and graphical data describing a plurality of transaction options, and for selectively retrieving data from said mass memory;
   means for storing information, inquiries, and orders for transactions entered by said operator via said means for entering information;
   means for transmitting said inquiries and orders to said installation via said means for communicating;

means for receiving data comprising operator-selected information and orders from said installation via said means for communicating; and means for interactively directing the operation of said computer, video display, data receiving and transmitting means, and mass memory comprising means for holding an operational sequencing list, means for processing said operator-entered information, inquiries, and orders according to backward-chaining and forward-chaining sequences, and means responsive to the status of said computer, display, mass memory, and data receiving and transmitting means for controlling their operation;

said means for processing including means for analyzing said operator-entered information and means, responsive to said means for analyzing, for presenting additional inquiries in response to said operator-entered information;

said computerized installation further including:

means responsive to items received from said station for immediately transmitting selected data retrieved from said database to said station;

means responsive to an order received from said station for updating data in said database including means for correlating to a particular set of data received from said station;

whereby said system can be used by a plurality of entities, each using one of said stations, to exchange data, and to respond to inquiries and orders instantaneously or over a period of time.

2. The data processing system of claim 1, wherein at least one of said stations comprises a tangible record-generator and means associated therewith to generate a document.

3. The system of claim 1, wherein said textual data comprise codes, words, phrases, numbers, and letters.

4. The system of claim 3, wherein said graphical data include still pictures, and moving images.

5. The system of claim 4, wherein said station further comprises means for generating audio information.

6. The system of claim 1, wherein said mass memory comprises an optical disc.

7. The system of claim 5, wherein said means for selectively and interactively presenting comprises means for retrieving and combining textual data and graphical data, to process said textual and graphical data into audio-visual signals, and to apply said signals to said video display.

8. An automated multimedia system for data processing for delivering information on request to at least one user, which comprises:

at least one computerized station;

means for accepting and processing an user's entry according to backward-chaining and forward-chaining sequences, including:

means for analyzing and for combining an user's entry with a set of stored data, and means, responsive to said means for analyzing and for combining, for formulating a query and outputting said query to said user; and means for delivering information to said user.

9. The system of claim 8, wherein said means for formulating comprise means for presenting a question to said user.

10. The system of claim 9, wherein said means for formulating further comprise means for requesting information for said user.

11. The system of claim 9, wherein:

said means for combining comprise means for searching said set of stored data; and said means for formulating comprise means for selectively retrieving said question from a plurality of stored questions.

12. The System of claim 10, wherein:

said means for combining further comprise means for matching part of said user's entry with part of said set of stored data; and said means for requesting comprise means for generating an information request message.

13. The system of claim 10, which further comprises:

a storage means;

means for addressing said storage means with said request message; and computer programs for controlling said various means.

14. The system of claim 13, wherein said means for delivering further comprise means for translating textual information into graphical information.

15. The system of claim 13, wherein said means for delivering further comprises means for translating textual information into audio-visual information.

16. An automated multimedia data processing system which comprises:

at least two computerized stations, each including:

at least one access means;

a mass memory and a database stored in said mass memory;

means for storing, processing, updating, and retrieving data;

program means for controlling said storing, processing, updating, and retrieving data means in response to coded requests entered on said access means;

means, associated with said mass memory, for storing and retrieving textual and graphical data;

means for processing interrelated textual and graphical data describing a plurality of transaction options, and for selectively retrieving data from said mass memory; interrelated textual and graphical data stored in said mass memory, and accessible through interrelated textual and graphical access path means;

means for accepting and processing said requests according to backward-chaining and forward-chaining sequences;

means responsive to said coded requests for automatically displaying selected data;

means for interactively directing the operation of said various means, and of said mass memory, said means for directing comprising means for holding an operational sequencing list and means responsive to the status of said mass memory, and said various means, for controlling their operations.

17. The system of claim 16, which further comprises:

a computerized installation; wherein each of said stations comprises:

means for entering and transmitting requests to said installation;

means for receiving data from said installation; and means for displaying said data.

* * * * *